United States Patent [19]

Visser

[11] Patent Number: 4,980,628
[45] Date of Patent: Dec. 25, 1990

[54] CONTROL SYSTEM

[75] Inventor: Nicolaas J. Visser, Bolsward, Netherlands

[73] Assignee: Stork Kwant B.V., Netherlands

[21] Appl. No.: 372,292

[22] Filed: Jun. 27, 1989

[30] Foreign Application Priority Data

Jun. 29, 1988 [NL] Netherlands ........................ 8801653

[51] Int. Cl.⁵ ............................................ G05B 19/31
[52] U.S. Cl. ................................... 318/605; 318/628;
318/568.19; 114/144 E; 114/144 R; 114/144 RE
[58] Field of Search ................... 318/605, 628, 568.19;
114/144 E, 144 R, 144 RE

[56] References Cited

U.S. PATENT DOCUMENTS 3,865,063  2/1975  Norton ............................. 114/144 R
4,301,759 11/1981  de Vries ........................... 114/144 E
4,510,574  4/1985  Guittet ................................. 318/628
4,661,032  4/1987  Arai ............................ 318/568.19 X

FOREIGN PATENT DOCUMENTS 1763450 11/1971  Fed. Rep. of Germany .
7601464  8/1977  Netherlands .

Primary Examiner—William M. Shoop, Jr.
Assistant Examiner—Saul M. Bergmann
Attorney, Agent, or Firm—Webb, Burden, Ziesenheim & Webb

[57] ABSTRACT

An electronic processing circuit 17 compares digital signals representing the position of a number of mutually connected control members to the contents of an electronic memory 18. On detecting a difference indicating the displacement of the position of one of the control members, the circuit 17 actuates those motors of motors 4, 5, 6 which are associated with the non-actuated control members in order to make them follow the displacement. Excessive displacements indicating a fault are shown on an indicator 19.

3 Claims, 1 Drawing Sheet

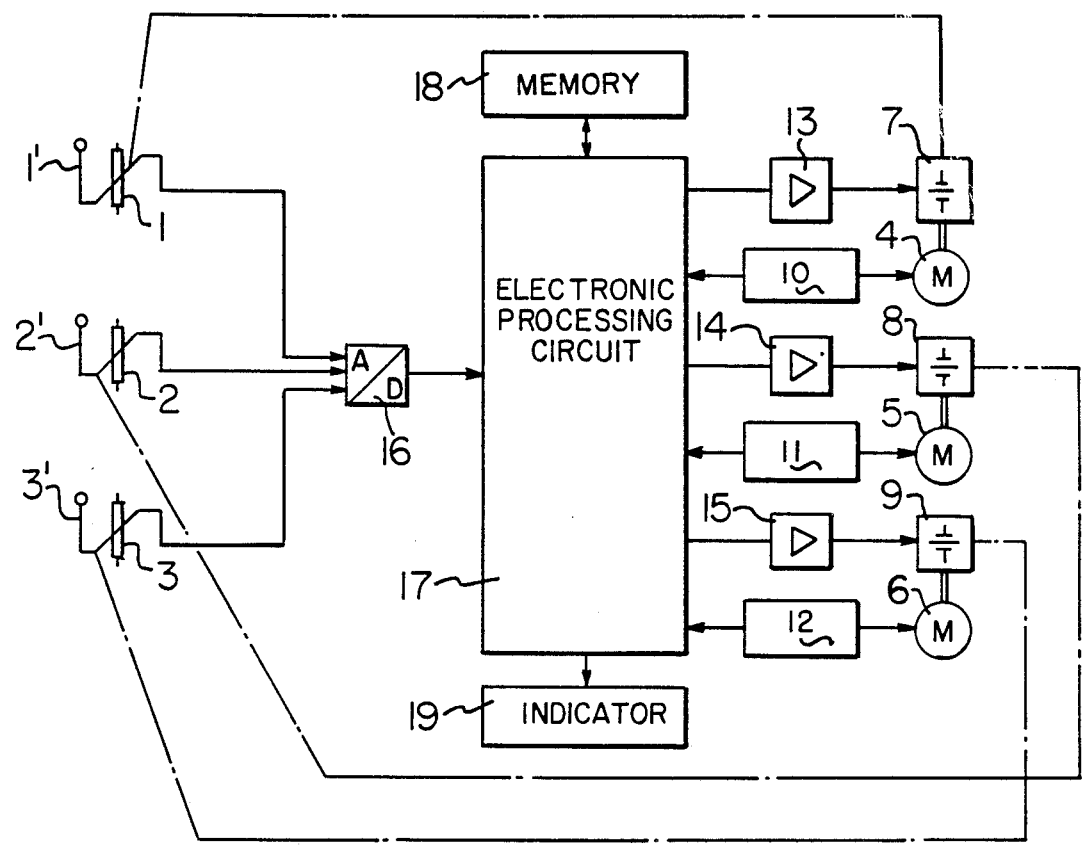

CONTROL SYSTEM

This invention relates to a control system consisting of a number of control members that are connected mutually and to a device to be controlled, whereby each control member is coupled to a potentiometer, a follow-up member with a servo motor is assigned to each control member to cause the other control members to follow when one control member is actuated, and a memory for storing the position of the last actuated control member. Such a system is particularly useful in controlling equipment on a ship, including the ship's telegraphs and the control handles for the remote control of the engine and/or adjustable screw blades on board.

Such a control system is known from U.S. Pat. No. 4,301,759. In the known control system, the memory is formed by a second potentiometer associated with each potentiometer that is coupled to the control member. The position of the second potentiometer shows the position of the last actuated control member. Should a control member be actuated, the second potentiometers then follow the displacement, which new position then serves as a reference during a subsequent actuation of one of the control members. On the basis of the difference between the reference value and the momentary position of the control member, an error signal is formed which serves as a control signal to cause both the remaining operating members and the associated potentiometers serving as memory to move to the new position.

Potentiometers are comparatively bulky and expensive, while the accuracy of the displacement is also limited.

This invention has for its object to obviate these drawbacks. This is achieved according to the invention in that the memory is formed by an electronic memory storing a digital value and in that means are arranged for relating the content of the memory to the position of a control member.

As a result of the invention, the stated drawbacks are overcome since the relation of the reference value stored in the electronic memory can be performed rapidly while its size is moreover limited. Such a memory and the associated control circuits can furthermore be integrated into the circuit means, amplifiers and the like already available.

In order to obtain the digital signals, each control member potentiometer is connected to the memory via an analog-digital converter.

In the case of a control system, wherein control signals which cause control members to follow are generated when a predetermined difference between the value stored in the memory and the value representing the position of an actuated control member is exceeded, in accordance with the invention the predetermined difference for the last adjusted control member is chosen smaller than that for the other control members. A certain priority results which enables the possibility that the last actuated control member can still be adjusted for small differences by a fine-adjustment.

The electronic embodiment of the memory according to the invention also makes it possible to form control signals for a fault indicator when predetermined values are exceeded. When the formed signals display abnormal characteristics, this indicates a fault and this can be indicated in a simple manner.

One embodiment of a control system in accordance with the present invention is shown in the sole figure of the drawings.

Shown in the figure are three control members each having a potentiometer 1, 2, 3 coupled to a control handle 1', 2', 3'. The potentiometers 1, 2, 3 form a feeding element for each control member. Added to each control member is a follow-up member in the form of a servo motor 4, 5, 6 connected via an associated coupling 7, 8, 9 to an associated potentiometer 1, 2, 3, respectively. The connections are shown by the dotted lines in the figure. By means of an analog-digital converter 16, the position of the potentiometers 1, 2 and 3 is continually sampled and passed via an electronic processing circuit 17 to a suitable place in an associated electronic memory 18. The motors 4, 5, 6 are connected to the electronic processing circuit 17 and vice versa by circuits 10, 11, 12 therebetween. The couplings 7, 8, 9 are connected to the electronic processing circuit 17 and actuated thereby through amplifiers 13, 14, 15.

When one of the control members is actuated, a difference will be detected by the electronic processing unit 17 between the momentary sampled value of the potentiometer associated with the actuated control member and the values stored in the memory 18. On the basis of this difference, a control signal is formed which brings about rotation of the servo motors 4, 5 and 6 associated with the other operating members in the correct direction and over the correct distance to match the change in the actuated control member. Because the couplings associated with the motors are energized, that is, those couplings of the couplings 7, 8 and 9 which are associated with the non-actuated control members, the other control members are adjusted through the relevant amplifiers. The circuits 10, 11 and 12 feed the correct control signals to the relevant motors. During the control process, the reference value in the memory 18 is also adapted to the displacement of the control members so that, as is usual in a control process, the error or control signal takes a continually smaller value until the differential value between the potentiometer of the manually actuated lies below a set value ("dead" band).

For example, assume that the control handle 1', of the first control member is moved to a new position. This is immediately reflected in a new position for potentiometer 1 which generates a new electrical signal supplied through the analog-digital converter 16 to the electronic processing circuit 17. The new value generated by potentiometer 1 is different from the old value stored in the memory 18 and, through this difference, the electronic processing circuit 17 detects that the first control member has been moved to a new position. The electronic processing circuit 17 then generates the necessary signals to move the other control members to this new position. The electronic processing circuit 17 generates a signal supplied through amplifiers 14 and 15 to actuate couplings 8 and 9 to connect motors 5 and 6 to potentiometers 2 and 3, respectively. Since potentiometer 1 was moved previously, and forms the basis for this control operation, no signal is supplied through amplifier 13 to coupling 7 and, hence, motor 4 remains disconnected from potentiometer 1. The electronic processing circuit 17 then supplies signals through circuits 11 and 12 to motors 5 and 6, respectively, which move potentiometers 2 and 3 to match the new position of potentiometer 1. Once the new positions have been reached, the memory 18 is updated appropriately.

When abnormal values are detected in the electronic processing unit 17, which indicates a fault, this is shown on an indicator 19 which generates an audio or visual signal to the user.

I claim:

1. A control system comprising:
 a plurality of control members electrically coupled with one another, each control member including a potentiometer coupled to a control handle;
 a plurality of follow-up members which may be coupled to the control members, with each follow-up member including a servo motor connected through a coupling to the potentiometer of an associated control member;
 electronic memory means for storing a digital signal representing the position of the last actuated control member; and
 electronic processing circuit means for, by means of the signal in the memory means determining the difference in positions of a control member after it has been actuated and moved to a new position, then actuating the follow-up members of the other control members to move them to a position matching that of the actuated control member, and then updating the memory means to reflect the new position of the control members.

2. The control system of claim 1 wherein the potentiometers of the control members are coupled to the electronic processing circuit means and, thereby, the memory means, through an analog-digital converter.

3. The control system of claim 1 wherein the electronic processing circuit actuates the follow-up members when a predetermined difference between the value stored in the memory means and the value representing the position of an actuated control member is exceeded.

* * * * *